Patented Jan. 16, 1923.

1,442,420

UNITED STATES PATENT OFFICE.

LEO H. BAEKELAND, OF YONKERS, NEW YORK, ASSIGNOR, BY MESNE ASSIGNMENTS, TO BAKELITE CORPORATION, OF NEW YORK, N. Y., A CORPORATION OF NEW YORK.

POTENTIALLY REACTIVE COMPOSITION AND PROCESS OF MAKING SAME.

No Drawing.   Application filed October 31, 1919. Serial No. 334,851.

*To all whom it may concern:*

Be it known that I, LEO H. BAEKELAND, a citizen of the United States, residing at Yonkers, in the county of Westchester and State of New York, have invented certain new and useful Improvements in Potentially Reactive Compositions and Processes of Making Same, of which the following is a specification.

In my prior U. S. Patent No. 1,354,154, patented Sept. 28, 1920, I have described and claimed a potentially reactive composition comprising a phenol resin and a methyleneamin-phenol, specifically hexamethylenetetraminetriphenol or the cresol derivatives corresponding thereto. In the said application I have pointed out that the methyleneamin-phenols are capable of entering into reaction with the so-called phenol resins (which term is used therein broadly to include the phenolic condensation products of the permanently fusible and soluble type, otherwise known as saliretins) to yield phenolic condensation products of the infusible type; and that mixtures of phenol resins with methyleneamin-phenols, or the first or partial reaction products derived from such mixtures, constitute highly desirable starting materials for the production of such infusible phenolic condensation products. As such starting materials they may, as fully explained in the said application, be employed alone, or in conjunction with plasticizing agents, or with fibrous or other filling materials for the preparation of molding mixtures. I have also pointed out therein that these starting materials may be dissolved in appropriate organic solvents for the preparation of varnishes, impregnating solutions, cements or the like. I have further pointed out in the said application that inasmuch as the phenol resins may be regarded as derived by dehydration from phenol-alcohols, the latter bodies are to be considered as equivalents for the phenol resins as starting materials for the purposes of that reaction.

The present application relates more specifically to the reactions between the methyleneamin-phenols, of which hexamethylenetetramine-triphenol will be considered as a type, and the phenol-alcohols, or such derivatives thereof as are soluble in water or capable of being diluted to a greater or less extent by water.

The use of these water-soluble substances as starting materials for the manufacture of the phenolic condensation products of the infusible class presents several advantages. It not only allows great precision in the reaction and ready control of the proportions of the reacting bodies and of the character of the reaction products, both primary and secondary, but the great solubility of the reacting materials in solvents in general, and more particularly in water, introduces in many cases important technical advantages in the utilization of these products as well as in the methods of their preparation.

For example, in the impregnation of paper, fabrics, or other porous materials, including the manufacture of so-called composite cardboard (see U. S. Patent 1,019,406, patented March 5, 1912 to L. H. Baekeland) an aqueous solution of a phenol-alcohol and hexamethylenetetraminetriphenol, or the corresponding addition products derived from cresols or cresol-mixtures, can be used instead of the solutions prepared with more expensive organic solvents, alcohol or the like, which latter also have the disadvantage of being inflammable or explosive.

Such mixtures, and certain of the initial products of condensation prepared therefrom, are not only readily soluble, but they are comparatively easily fusible, which imparts a very desirable plasticity in the initial operations of pressing or molding, when used alone or in admixture with fibrous or other filling materials.

Instead of mixing the pre-formed phenol-alcohol and methyleneamin-phenol, either in the dry state or in presence of water, the process can be still further simplified and cheapened by producing the penol-alcohols or equivalent water-soluble reaction products derived from phenols and formaldehyde or its polmyers and equivalents, directly in aqueous solution, using for this purpose any of the well known methods. To the aqueous solution of phenol-alcohols thus prepared I may add an aqueous solution of a methyleneamin-phenol, such as hexamethylenetetramine-triphenol, without necessity of purifying either of such solutions, whether by crystallization or otherwise. The mixed solution prepared as above either as such or after being concentrated to any desired degree by evaporation, can be utilized for impregnating or coating, for the manufacture of composite cardboard or the like, and in general for all of the purposes for which solutions of phenolic condensation products are used in this art. The solution, or concentrate or residue therefrom, may likewise be compounded with suitable filling materials, such for example as wood flour, and the resulting molding mixtures can then be shaped or hardened in accordance with the now well known methods involving the employment of heat or of heat and pressure.

After the admixture of the methyleneamin-phenol and the phenol-alcohol a limited reaction may occur between these bodies, evidenced by the setting free of ammonia; but when aqueous solutions of the potentially reactive composition are desired, this reaction is not permitted to pass the stage at which the reaction product is soluble in or capable of dilution by water or aqueous solutions. Such water-soluble reaction products are, for the purposes of this invention equivalent to the raw materials from which they are derived.

The proportions in which the methyleneamin-phenol and the phenol-alcohol are caused to react may be widely varied in accordance with the particular results sought to be obtained. For example a mixture containing 90 parts by weight of phenol-alcohol and 10 parts of hexamethylenetetramine-triphenol will yield by further reaction, most advantageously carried out under pressure, a hard and infusible final product which is highly resistant to most solvents, although it may be attacked by acetone without complete solution therein. But in general I prefer to employ larger proportions of the methyleneamin-phenol than are above indicated, since such larger proportions tend to produce a final product of greater strength and also of better heat-resisting quality. In the manufacture of transparent goods in particular it is desirable to use rather large proportions of hexamethylenetetramine-triphenol relative to the phenol-alcohol. Thus I have obtained excellent end products using as high as 90 parts of hexamethylenetetramine-triphenol to 10 parts of phenol-alcohol. Certain representative formulae which are, however, to be regarded as illustrative only, are as follows:

*Example I.*—Oxybenzylalcohol 50 parts by weight. Hexamethylenetetraminetriphenol 50 parts by weight. Melted together and heated in an open vessel until bubbling occurs and the melted material acquires a somewhat thicker consistency. Then heated at about 150° C., under sufficient pressure so as to prevent porosity, for about ten hours, or less in case higher temperatures are used.

*Example II.*—Oxybenzylalcohol 85 parts by weight. Hexamethylenetetraminetriphenol 15 parts by weight. Melt together and heat as in Example I.

These operations can be carried out under various conditions and with or without admixtures as is now well known in this art. A preponderant amount of phenol-alcohol tends to give products which have a more "horny" cut.

As stated above, the hexamethylenetetramine-triphenol may be wholly or partly replaced by homologs, or substances of similar composition, such as the derivatives of hexamethylenetetramine and the cresols, or the di- or other poly-phenols. The phenol-alcohols are, as is well known, water-soluble bodies derived from phenols, cresols, etc., by reaction with formaldehyde; and I use the term herein to include broadly such reaction products of phenols and formaldehyde, paraform and equivalent bodies containing a mobile methylene group, as are soluble in or capable of being diluted by water. For example I may prepare a solution of about equimolecular proportions or somewhat less of paraform in phenol, preferably with the addition of a minute proportion, say about 0.25% or less, of caustic soda or equivalent condensing agent, and such solution, being susceptible of dilution by water, is to be regarded as an equivalent for the phenol-alcohols for the purposes of this invention. Again, by inducing in such a solution a carefully controlled and limited reaction I am enabled to prepare a potentially reactive phenolic condensation product which is soluble in or can be diluted by water, and which, therefore, is likewise utilizable for the purposes of this invention.

Naturally alcohol or other organic liquids or substances which are soluble in or miscible with water, or with the aqueous solutions of phenolic condensation products hereinabove described, may be added to the above described solutions without departing from the spirit of my invention, which contemplates broadly the preparation of phenolic condensation products of the infusible type from raw materials, or initial reaction mixtures, which are water-soluble or susceptible of being diluted by water and aqueous solutions.

The term "potentially reactive composition" is used herein to designate a composition or mixture which will by further reaction, under the influence of heat or of heat and pressure, yield a phenolic condensation product of the infusible type.

Where reference is made in the claims to aqueous solutions containing a methyleneamin phenol and a phenol alcohol, it is to be understood that the expression is intended to include any reaction products of these bodies which are capable of existing in aqueous solution.

I claim:—

1. Process of making a potentially reactive composition, comprising commingling a methyleneamin-phenol and a phenol-alcohol.

2. Process of making a potentially reactive composition, comprising commingling in presence of water a methyleneamin-phenol and a phenol-alcohol.

3. Process of making a potentially reactive composition, comprising reacting upon a methyleneamin-phenol with a phenol-alcohol, and arresting the reaction before the water-insoluble stage is reached.

4. Process of making a potentially reactive composition, comprising reacting upon a methyleneamin-phenol with a phenol-alcohol in presence of water, and arresting the reaction before the water-insoluble stage is reached.

5. Process of making a potentially reactive composition, comprising commingling hexamethylenetetramine-triphenol and a phenol-alcohol.

6. Process of making a potentially reactive composition, comprising commingling in presence of water hexamethylenetetramine-triphenol and a phenol-alcohol.

7. Process of making a potentially reactive composition, comprising reacting upon hexamethylenetetramine-triphenol with a phenol-alcohol, and arresting the reaction before the water-insoluble stage is reached.

8. Process of making a potentially reactive composition, comprising reacting upon hexamethylenetetramine-triphenol with a phenol-alcohol in presence of water, and arresting the reaction before the water-insoluble stage is reached.

9. A potentially reactive composition, comprising a methyleneamin-phenol and a phenol-alcohol, said composition characterized by solubility in water and aqueous solutions.

10. An aqueous solution containing a methyleneamin-phenol and a phenol-alcohol.

11. A potentially reactive composition comprising hexamethylenetetramine-triphenol and a phenol-alcohol, said composition characterized by solubility in water and aqueous solutions.

12. An aqueous solution containing hexamethylenetetramine-triphenol and a phenol-alcohol.

In testimony whereof, I affix my signature.

LEO H. BAEKELAND.